US00RE40308E

(19) United States
(12) Reissued Patent
Hamilton et al.

(10) Patent Number: US RE40,308 E
(45) Date of Reissued Patent: May 13, 2008

(54) MULTI-PURPOSE INJECTION AND PRODUCTION WELL SYSTEM

(75) Inventors: Mark D. Hamilton, Aberdeen (GB); Robert C. Smith, Aberdeen (GB); Neil Walker, Aberdeen (GB); Kjell Einar Revheim, Esbjerg (DK)

(73) Assignee: Baker Hughes Incorporated, Houston, TX (US)

(21) Appl. No.: 10/994,219

(22) Filed: Nov. 19, 2004

(Under 37 CFR 1.47)

Related U.S. Patent Documents

Reissue of:
(64) Patent No.: 6,481,503
Issued: Nov. 19, 2002
Appl. No.: 09/756,995
Filed: Jan. 8, 2001

(51) Int. Cl.
*E21B 34/06* (2006.01)
*E21B 43/14* (2006.01)

(52) U.S. Cl. ..... 166/313; 166/102; 166/191; 166/332.1; 166/386

(58) Field of Classification Search ..... 166/320, 166/323, 102, 191, 313, 332.1, 386
See application file for complete search history.

(56) References Cited

U.S. PATENT DOCUMENTS

| | | | | | |
|---|---|---|---|---|---|
| 1,778,740 | A | | 10/1930 | Wrightman | 166/184 |
| 1,861,332 | A | | 5/1932 | Waitz | 166/115 |
| 2,107,006 | A | | 2/1938 | Lang | 166/100 |
| 2,403,987 | A | | 7/1946 | Lewis | 166/115 |
| 2,629,447 | A | | 2/1953 | Nebolsine | 166/100 |
| 2,649,916 | A | * | 8/1953 | Brown | 166/145 |
| 2,885,008 | A | | 5/1959 | Hoffer | 166/136 |
| 3,283,570 | A | * | 11/1966 | Hodges | 73/152.31 |
| 3,765,489 | A | | 10/1973 | Maly | 166/310 |
| 3,842,912 | A | | 10/1974 | Lindsey, Jr. | 166/191 |
| 3,945,436 | A | | 3/1976 | Nebolsine | 166/187 |
| 4,258,787 | A | | 3/1981 | Amancharla | 166/120 |
| 4,274,487 | A | | 6/1981 | Hollingsworth et al. | 166/251.1 |
| 5,918,669 | A | * | 7/1999 | Morris et al. | 166/50 |
| 6,006,838 | A | | 12/1999 | Whiteley et al. | 166/306 |
| 6,318,469 | B1 | | 11/2001 | Patel | 166/205 |
| 6,439,312 | B1 | * | 8/2002 | Hess et al. | 166/313 |
| 6,494,264 | B2 | * | 12/2002 | Pringle et al. | 166/313 |
| 6,516,886 | B2 | * | 2/2003 | Patel | 166/313 |
| 6,722,440 | B2 | * | 4/2004 | Turner et al. | 166/374 |
| 2001/0045290 | A1 | | 11/2001 | Pringle et al. | 166/386 |

FOREIGN PATENT DOCUMENTS

WO WO 00/29708 A1 5/2000

OTHER PUBLICATIONS

Baker Oil Tools; Aberdeen Special Products Technical Manual, "Cross Flow" Injection & Production Sub, Feb. 16, 1998, Product No. 700–41; Unit No. AB–0149–000; Index 410.20; 1 page.

(Continued)

*Primary Examiner*—George Suchfield
(74) *Attorney, Agent, or Firm*—Shawn Hunter

(57) ABSTRACT

A method and apparatus for simultaneously producing fluid from one or more zones of an oil or gas well, while injecting fluid into one or more other zones of the well, and for converting a depleted production zone into an injection zone, by remotely shifting sleeves in the apparatus to selectively align inlet and outlet ports with production and injection flow paths, respectively. A production string is provided within a completion string; the completion string has inlet and outlet ports to the well bore. One or more production sleeves have production conduits which can be selectively aligned with inlet ports by shifting the production sleeves. One or more injection sleeves have injection conduits which can be selectively aligned with outlet ports by shifting the injection sleeves.

45 Claims, 4 Drawing Sheets

OTHER PUBLICATIONS

Baker Oil Tools; Flow Control Technical Unit; Model "HCM " Surface Controlled Tubing Mounted Hydraulic Sliding Sleeve; Mar. 1999; Product No. 811–34; Unit No.4752; Index 480.10; 1 page.

Baker Oil Tools; Flow Control Systems Technical Unit; Dual Flow Head Injection and Production System; Nov. 17, 1999, Product Family No. H70040; Unit No. 4805; Index 480.10; 1 page.

Baker Oil Tools; Flow Control Systems Technical Unit; Test Sleeve for Dual Flow Head System; Jun. 1999; Product Family No. H99508; Unit No. 4806; Index 480.30; 1 page.

Baker Oil Tools; Flow Control Systems Technical Unit; Blanking Plug for Dual Flow Head System; Jun. 1999; Product Family No. H83611; Unit No. 4807; Index 480.30; 1 page.

Baker Oil Tools; Flow Control Systems Technical Unit; Isolation Sleeve for Dual Flow Head System; Jul. 1999; Product Family No. H99508; Unit No. 4808; Index 480.30; 1 page.

Baker Oil Tools; Flow Control Systems Technical Unit; Equalizing Test Sleeve for Dual Flow Head System; Jul. 1999; Product Family No. H99508; Unit No. 480.30; 1 page.

Baker Oil Tools; Flow Control Systems Technical Unit; Separation Sleeve for Dual Flow Head System; Jul. 1999; Product Family No. H99508; Unit No. 4827; Index 480.30; 1 page.

Baker Oil Tools; Flow Control Systems Technical Unit; Separation Sleeve for X–Flow Injection and Production System; Feb. 22, 2000; Product Family No. H70042; Unit No. 4893; Index 480.30; 1 page.

Baker Oil Tools; Flow Control Systems Technical Unit; Injection Sleeve for X–Flow Injection and Production System; Feb. 22, 2000; Product Family No. H70043; Unit No. 4894; Index 480.30 (draft 1); 1 page.

Baker Oil Tools; Flow Control Systems Technical Unit; Baker X–Flow Injection and Production System; Feb. 23, 2000; Product Family No. H70044; Unit No. 4896; Index 480.10 (draft 1); 1 page.

Baker Oil Tools; Packer Systems Technical Unit; Baker Model SB–RM Hydro–Set Retainer Production Packer with Integral Annulus Flow Sleeve (AFS); Feb. 25, 1999; Product Family No. H40950; Unit No. 4897; Index 410.10; 1 page.

Baker Oil Tools; Flow Control Technical Unit; Models "CMD" and "CMU " Non–Elastomeric Sliding Sleeves; Feb. 15, 2000; Product Family No.s H8108 Oand H81079; Unit No. 8697; Index 480.10; 1 page.

Baker Oil Tools; X–Flow Injection & Production System; poster.

Baker Oil Tools; Aberdeen Special Products Technical Manual; *"Cross Flow " Injection & Production Sub;* Feb. 16, 1998; Product No. 700–41; Unit No. AB–0149–000; Index 410.20; 1 page.*

Baker Oil Tools; Flow Control Technical Unit; *Model "HCM" Surface Controlled Tubing Mounted Hydraulic Sliding Sleeve;* Mar., 1999; Product No. 811–34; Unit No. 4752; Index 480.10; 1 page.*

Baker Oil Tools; Flow Control Systems Technical Unit; *Dual Flow Head Injection and Production System;* Nov. 17, 1999; Product Family No. H70040; Unit No. 4805; Index 480.10; 1 page.*

Baker Oil Tools; Flow Control Systems Technical Unit; *Test Sleeve for Dual Flow Head Systems;* Jun., 1999; Product Family No. H99508; Unit No. 4806; Index 480.30; 1 page.*

Baker Oil Tools; Flow Control Systems Technical Unit; *Blanking Plug for Dual Flow Head Systems;*Jun., 1999; Product Family No. H83611; Unit No. 4807; Index 480.30; 1 page.*

U.S. Appl. No. 09/883,595, Pringle et al., filed Jun. 18, 2001.*

* cited by examiner

MULTI-PURPOSE INJECTION AND PRODUCTION WELL SYSTEM

Matter enclosed in heavy brackets [ ] appears in the original patent but forms no part of this reissue specification; matter printed in italics indicates the additions made by reissue.

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention is in the field of equipment used in the production of fluids from, and injection of fluids into, oil and gas wells having multiple zones.

2. Background Art

Many oil or gas wells extend through multiple formations, resulting in the establishment of multiple zones at different depths in the well. It may be desirable to produce formation fluids such as gas or oil from different zones at different times, and to inject fluids such as water into different zones at different times, for the purpose of ultimately obtaining the maximum production from the well. Further, it may be desirable to produce formation fluids from one or more zones, while simultaneously injecting fluids into one or more other zones. Finally, it may be desirable to convert a particular zone from a production zone into an injection zone, after the zone is depleted.

Known equipment for these purposes usually requires pulling the completion assembly from the well, and changing or reconfiguring the equipment in the assembly, when it is desired to commence or cease production or injection in a particular zone. Further, known equipment is generally limited to the production of fluid or the injection of fluid at any given time, with simultaneous production and injection not being possible, or at least difficult. More specifically, known equipment is not capable of the simultaneous production from multiple zones and injection into multiple zones.

BRIEF SUMMARY OF THE INVENTION

The present invention provides a method and apparatus for selectively injecting into a given zone or multiple zones, or producing from a given zone or multiple zones, without pulling the equipment from the well. A completion unit is positioned next to each zone of the formation, with zones being segregated by packers. An injection sleeve and a production sleeve are provided in each completion unit. Each sleeve essentially bridges between the completion string and the production string, which is within the completion string. Each sleeve is shifted, such as by hydraulic, electrical, or mechanical operation, to selectively align a conduit through the sleeve with its associated port in the wall of the completion string. When aligned with the inlet port, the conduit in the production sleeve conducts formation fluid into a production fluid path in the production string. When aligned with the outlet port, the conduit in the injection sleeve conducts injection fluid from an injection fluid path into the formation. Regardless of sleeve position, both injection flow and production flow can be maintained through the completion unit to other completion units above or below.

By selectively shifting the sleeves, selected zones can be isolated, produced from, or injected into, as desired. One or more lower zones can be injected into while one or more upper zones are produced from, or vice versa. If desired, alternating zones can be even be simultaneously produced from and injected into.

The novel features of this invention, as well as the invention itself, will be best understood from the attached drawings, taken along with the following description, in which similar reference characters refer to similar parts, and in which:

DETAILED DESCRIPTION OF THE INVENTION

Figure 1:
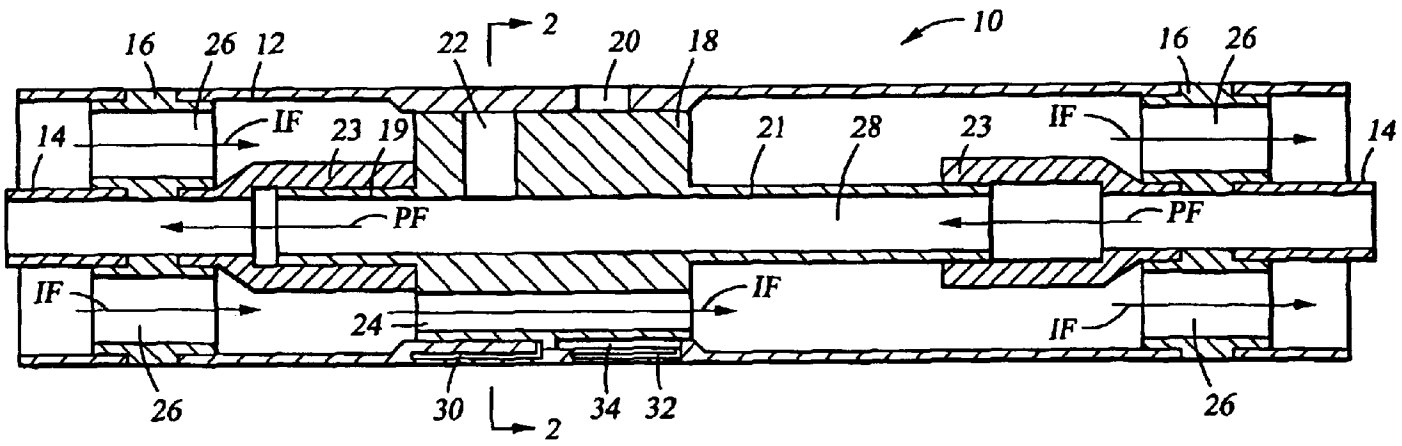
FIG. 1 is a longitudinal section of a production unit as implemented in the present invention, with production flow from the zone isolated.

As shown in FIG. 1, a production unit 10 used as part of the present invention includes a completion string 12 of tubing or piping, a production string 14 of tubing or piping, one or more centralizing rings 16, and a longitudinally shiftable production sleeve 18. This production unit can be placed in a well bore, aligned with a selected zone of the downhole formation. The completion string 12 shown is flush joint piping, and the production string 14 can be flush joint piping. Other types of piping or tubing can also be used. The production string 14 is substantially coaxially located within the completion string 12, centralized therein by the centralizing rings 16. An upper end 19 and a lower end 21 of the production sleeve 18 are configured to slidably mount within production string fittings 23, for shifting of the production sleeve 18 by means of longitudinal movement relative to the completion string 12. It will be seen that shifting of the production sleeve 18 could be rotational relative to the completion string 12, rather than longitudinal, if desired.

Figure 2:
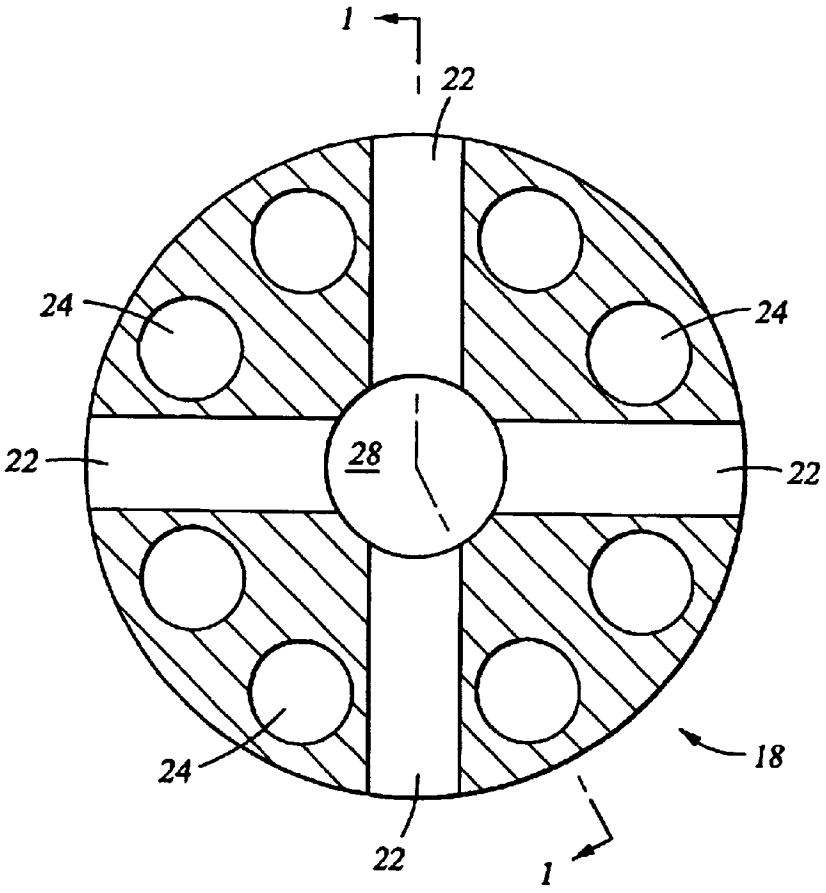
FIG. 2 is a transverse section of a production sleeve as used in the production unit of FIG. 1.

FIG. 2 shows a transverse section of the production sleeve 18. One or more production fluid conduits 22 are arranged more or less radially from the center of the production sleeve 18 to its outer periphery. One or more injection fluid bypass channels 24 pass longitudinally through the production sleeve 18, to ensure that injection fluid can bypass the production sleeve from an upper annulus to a lower annulus. A production fluid flow path 28 passes longitudinally through the production sleeve 18, ensuring the production fluid from a lower zone can pass to an upper zone. The production fluid conduits 22 are also in fluid flow communication with the production fluid flow path 28.

FIG. 1 shows only one of the production fluid conduits 22, and only one of the bypass channels 24. However, it can be seen that, regardless of the position of the production sleeve 18, an injection fluid flow path exists through the production sleeve 18 as indicated by the arrow labeled IF. Further, the injection fluid flow path continues through bypass channels 26 in the centralizing rings 16. This allows injection fluid pumped downhole in the annulus between the completion string 12 and the production string 14 to flow completely through the production unit 10 from an upper zone to a lower zone, regardless of the position of the production sleeve 18.

It also can be seen that, regardless of the position of the production sleeve 18, production fluid can flow through the production fluid flow path 28 in the production sleeve 18 as indicated by the arrow labeled PF. Further, production fluid can flow through the center of the centralizing rings 16, in the production fluid flow path 28 in the production string 14. This allows production fluid to flow completely through the production unit 10 from a lower zone to an upper zone, regardless of the position of the production sleeve 18.

Shifting of the production sleeve 18 could be accomplished by several different means, such as hydraulically, mechanically, or electrically, or a combination thereof. FIG. 1 shows one embodiment of a hydraulic shifting means, including an upper hydraulic duct 30, a lower hydraulic duct 32, and a two directional hydraulic chamber 34. A shoulder on the production sleeve 18 can be positioned in the hydraulic chamber 34. When the upper duct 30 is pressurized, the production sleeve 18 is shifted downwardly, or to the right in the figure. When the lower duct 32 is pressurized, the production sleeve 18 is shifted upwardly, or to the left in the figure. A similar hydraulic assembly could be used to rotationally shift the production sleeve 18, if preferred. Further, an electrical solenoid mechanism could accomplish either longitudinal or rotational shifting, if preferred. Still further, other known shifting mechanisms could be used to shift the production sleeve 18.

Figure 3:
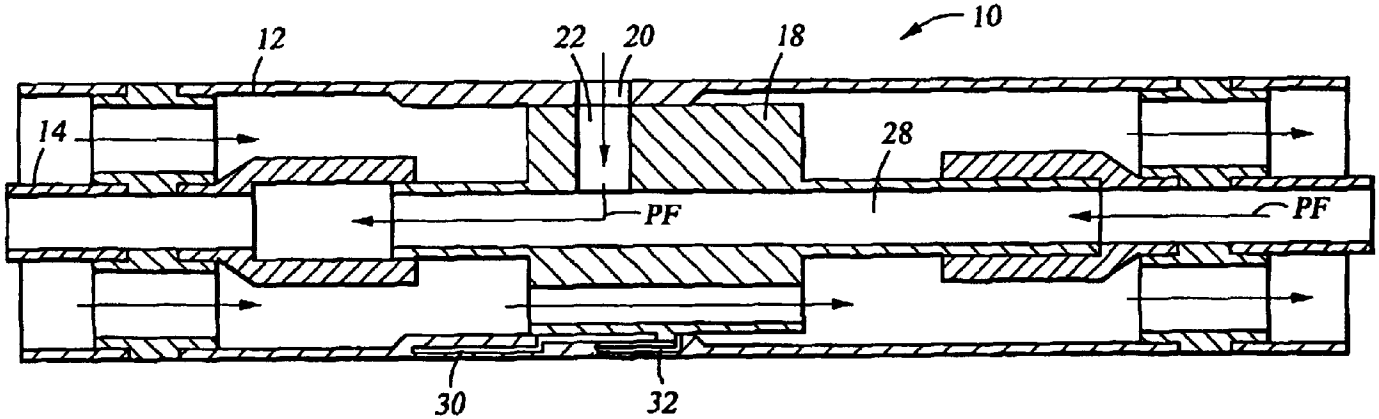
FIG. 3 is a longitudinal section of the production unit of FIG. 1, with production flow from the zone established.

A formation fluid inlet port 20 is formed through the wall of the completion string 12. The production fluid conduit 22 in the production sleeve 18 does not align with the inlet port 20, when the production sleeve 18 is in the upper position shown in FIG. 1. This isolates the inlet port 20, preventing flow of formation fluid through the inlet port 20, through the production fluid conduit 22, and into the production fluid flow path 28. FIG. 3 illustrates that the production sleeve 18 can be selectively shifted downwardly when desired, to align the production fluid conduit 22 with the inlet port 20. This establishes flow of formation fluid through the inlet port 20, through the production fluid conduit 22, and into the production fluid flow path 28.

Figure 4:
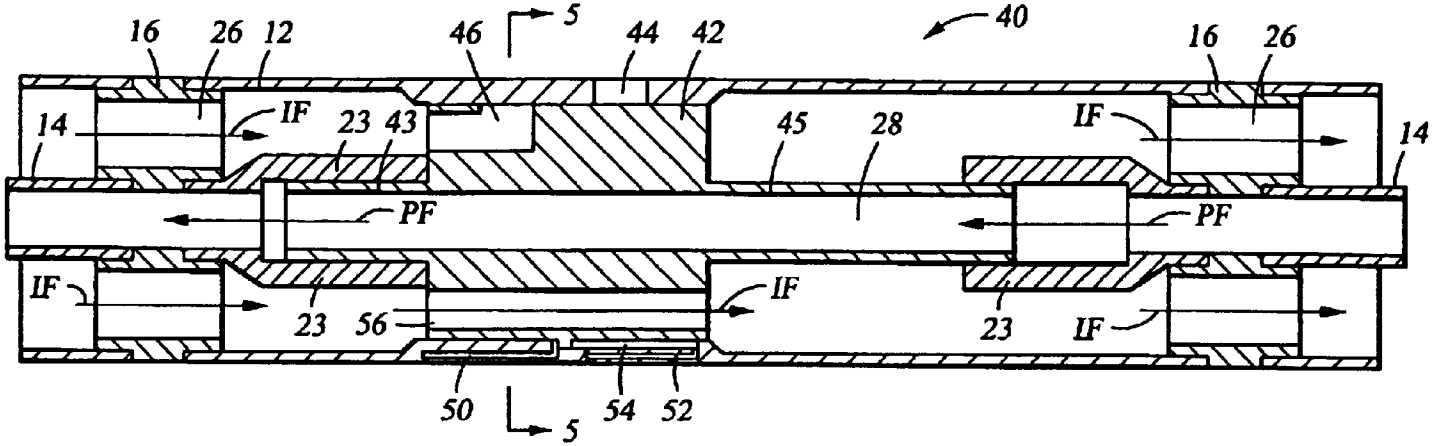
FIG. 4 is a longitudinal section of an injection unit as implemented in the present invention, with injection flow into the zone isolated.

As shown in FIG. 4, an injection unit 40 used as part of the present invention includes the completion string 12, the production string 14, one or more centralizing rings 16, and a longitudinally shiftable injection sleeve 42. This injection unit also can be placed in a well bore, aligned with a selected zone of the downhole formation. As will be seen, the injection unit 40 can be associated with a production unit 10 for a particular zone of the formation, to facilitate selective production from, or injection into, the zone. An upper end 43 and a lower end 45 of the injection sleeve 42 are configured to slidably mount within production string fittings 23, for shifting of the injection sleeve 42 by means of longitudinal movement relative to the completion string 12. It will be seen that shifting of the injection sleeve 42 could be rotational relative to the completion string 12, rather than longitudinal, if desired.

Figure 5:
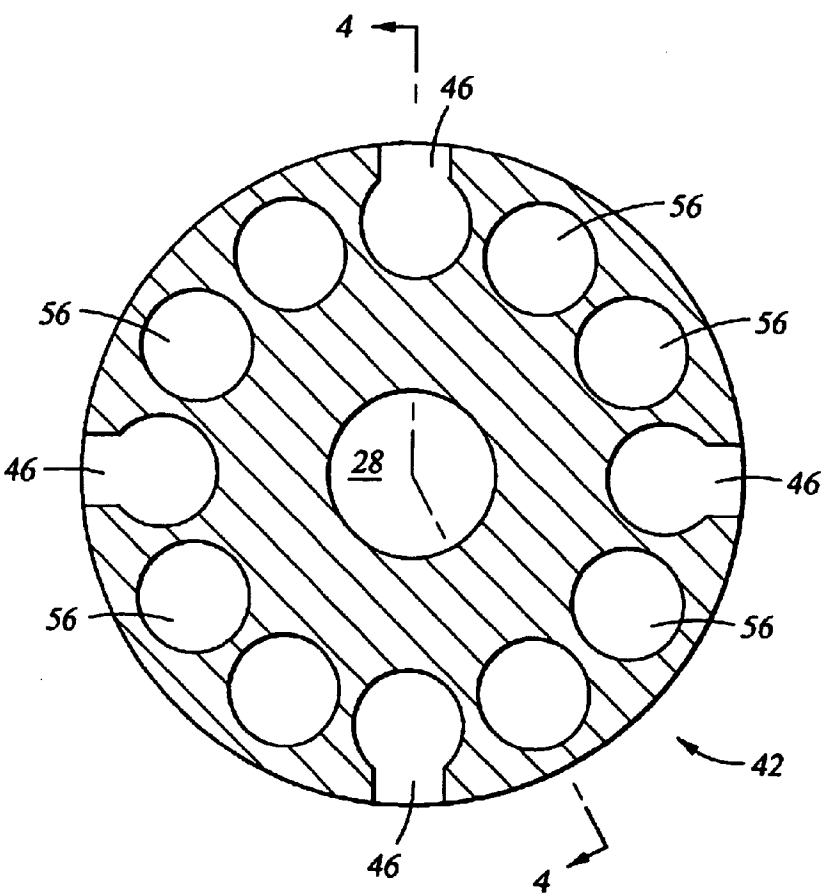
FIG. 5 is a transverse section of an injection sleeve as used in the injection unit of FIG. 4.

FIG. 5 shows a transverse section of the injection sleeve 42. One or more injection fluid conduits 46 are arranged at several locations, connecting the upper side of the injection sleeve 42 to its outer periphery. One or more injection fluid bypass channels 56 pass longitudinally through the injection sleeve 42, to ensure that injection fluid can bypass the injection sleeve from an upper annulus to a lower annulus. A production fluid flow path 28 passes longitudinally through the injection sleeve 42, ensuring the production fluid from a lower zone can pass to an upper zone.

FIG. 4 shows only one of the injection fluid conduits 46, and only one of the bypass channels 56. However, it can be seen that, regardless of the position of the injection sleeve 42, an injection fluid flow path exists through the injection sleeve 42 as indicated by the arrow labeled IF. Further, the injection fluid flow path continues through bypass channels 26 in the centralizing rings 16. This allows injection fluid pumped downhole in the annulus between the completion string 12 and the production string 14 to flow completely through the injection unit 40 from an upper zone to a lower zone, regardless of the position of the injection sleeve 42.

It also can be seen that, regardless of the position of the injection sleeve 42, production fluid can flow through the production fluid flow path 28 in the injection sleeve 42 as indicated by the arrow labeled PF. Further, production fluid can flow through the center of the centralizing rings 16, in the production fluid flow path 28 in the production string 14. This allows production fluid to flow completely through the injection unit 40 from a lower zone to an upper zone, regardless of the position of the injection sleeve 42.

Shifting of the injection sleeve 42 could be accomplished by several different means, such as hydraulically, mechanically, or electrically, or a combination thereof. FIG. 4 shows one embodiment of a hydraulic shifting means, including an upper hydraulic duct 50, a lower hydraulic duct 52, and a two directional hydraulic chamber 54. A shoulder on the injection sleeve 42 can be positioned in the hydraulic chamber 54. When the upper duct 50 is pressurized, the injection sleeve 42 is shifted downwardly, or to the right in the figure. When the lower duct 52 is pressurized, the injection sleeve 42 is shifted upwardly, or to the left in the figure. A similar hydraulic assembly could be used to rotationally shift the injection sleeve 42, if preferred. Further, an electrical solenoid mechanism could accomplish either longitudinal or rotational shifting, if preferred. Still further, other known shifting mechanisms could be used to shift the injection sleeve 42.

Figure 6:
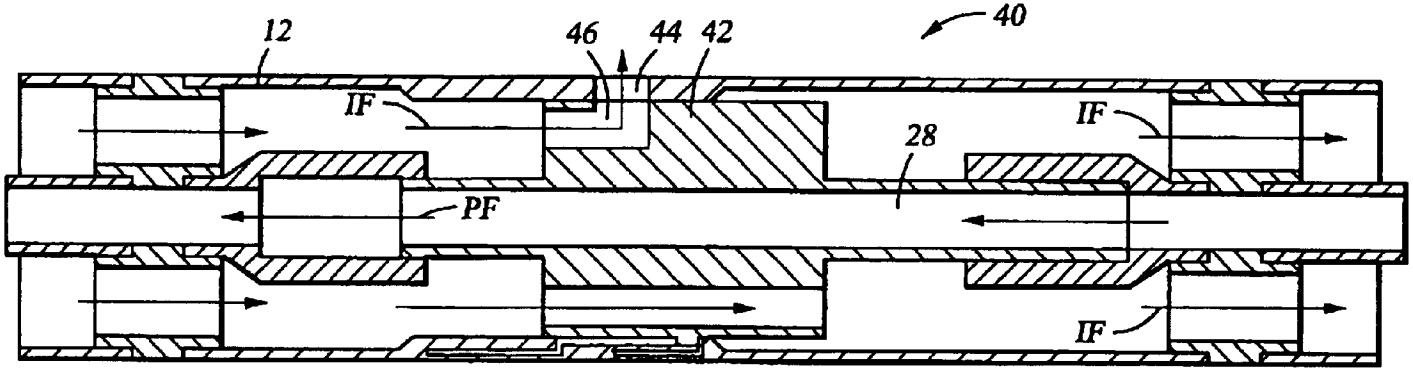
FIG. 6 is a longitudinal section of the injection unit of FIG. 4, with injection flow into the zone established.

An injection fluid outlet port 44 is formed through the wall of the completion string 12. The injection fluid conduit 46 in the injection sleeve 42 does not align with the outlet port 44, when the injection sleeve 42 is in the upper position shown in FIG. 4. This isolates the outlet port 44, preventing flow of injection fluid through the injection fluid conduit 46, through the outlet port 44, and into the formation. FIG. 6 illustrates that the injection sleeve 42 can be selectively shifted downwardly when desired, to align the injection fluid conduit 46 with the outlet port 44. This establishes flow of injection fluid through the injection fluid conduit 46, through the outlet port 44, and into the formation.

Figure 7:
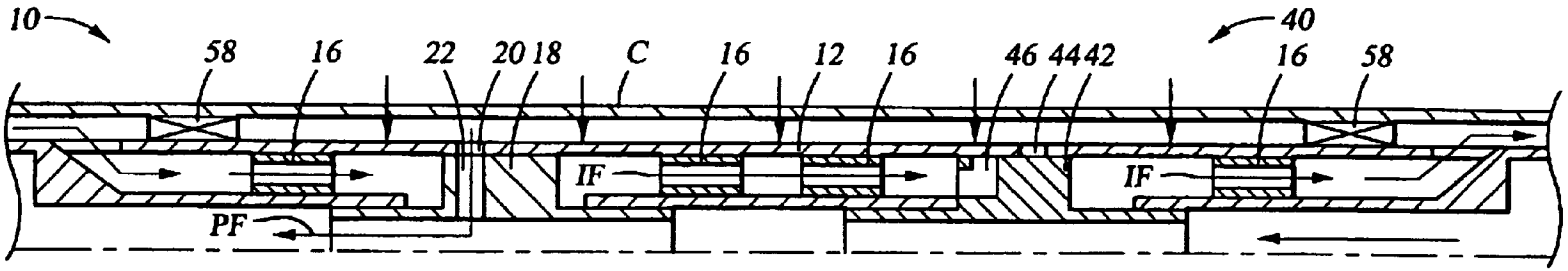
FIG. 7 is a longitudinal section of a completion unit, showing production flow from the zone established, and showing an alternative configuration of the completion and production strings.
Figure 8:
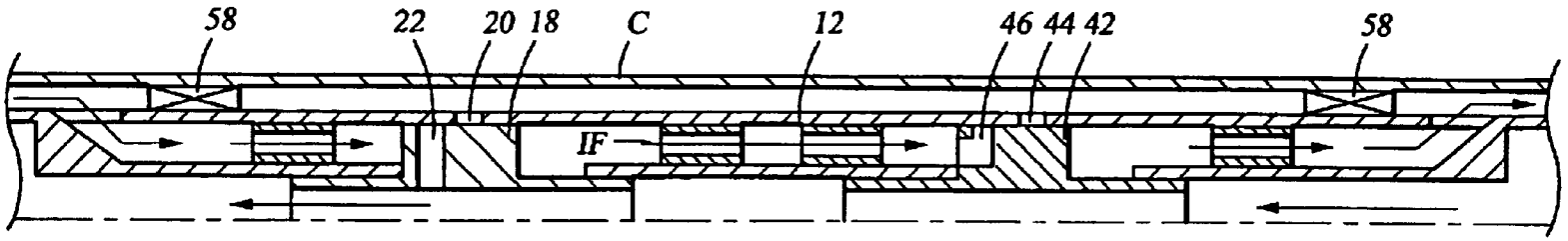
FIG. 8 is a longitudinal section of the completion unit of FIG. 7, showing production flow from the zone and injection flow into the zone both isolated.
Figure 9:
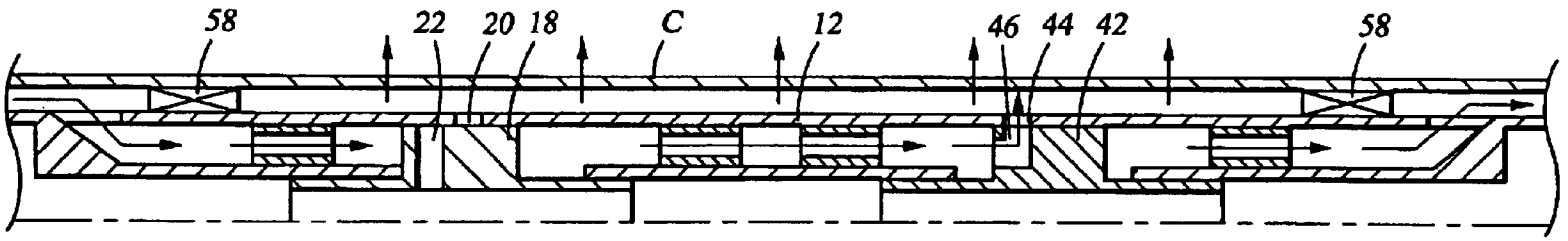
FIG. 9 is a longitudinal section of the completion unit of FIG. 7, showing injection flow into the zone established.

FIGS. 7, 8, and 9 illustrate the pairing of a production unit 10 with an injection unit 40 to form a completion unit, which can be placed downhole in a well bore, aligned with a selected zone of the formation. Packers 58 can be used to isolate adjacent zones. FIGS. 7, 8, and 9 also illustrate a variation of the configuration of the completion string and the production string, when it is desired to pump injection fluid into the annulus surrounding the completion string, rather than pumping injection fluid into an annulus between the completion string and the production string, as in the embodiments shown in FIGS. 1, 3, 4, and 6. In either embodiment, however, production fluid flow and injection fluid flow can be controlled as shown in FIGS. 7, 8, and 9.

FIG. 7 shows the production sleeve 18 in its lower position, and the injection sleeve 42 in its upper position. This establishes flow of formation fluid from the zone into the production fluid flow path 28, while preventing flow of injection fluid into the zone. FIG. 8 shows the production sleeve 18 in its upper position, and the injection sleeve 42 in its upper position. This prevents flow of formation fluid from the zone into the production fluid flow path 28, while also preventing flow of injection fluid into the zone. FIG. 9 shows the production sleeve 18 in its upper position, and the injection sleeve 42 in its lower position. This prevents flow of formation fluid from the zone into the production fluid flow path 28, while establishing flow of injection fluid into the zone.

It can be seen that, by selective shifting of the production sleeves 18 and the injection sleeves 42 in multiple zones, one or more zones can produce formation fluid, simultaneous with the injection of fluid into one or more other zones.

While the particular invention as herein shown and disclosed in detail is fully capable of obtaining the objects and providing the advantages hereinbefore stated, it is to be understood that this disclosure is merely illustrative of the presently preferred embodiments of the invention and that no limitations are intended other than as described in the appended claims.

We claim:

1. A system for injecting fluid into, and producing fluid from, multiple zones in a well bore, comprising:

a tubular completion string, said completion string having a production fluid inlet port and an injection fluid outlet port;

a production fluid flow path within said completion string;

an injection fluid flow path within said completion string;

a production [fluid] *sleeve* bypass channel connecting a portion of said injection fluid flow path above said production fluid inlet port to a portion of said injection fluid flow path below said production fluid inlet port;

an injection fluid bypass channel connecting a portion of said injection fluid flow path above said injection fluid outlet port to a portion of said injection fluid flow path below said injection fluid outlet port;

a production fluid conduit, said production fluid conduit being adapted to shift relative to said completion string to selectively conduct production fluid from said production fluid inlet port to said production fluid flow path; and an injection fluid conduit, said injection fluid conduit being adapted to shift relative to said completion string to selectively conduct injection fluid from said injection fluid flow path to said injection fluid outlet port.

2. The injection and production system recited in claim 1, wherein said production fluid conduit is slidably mounted in said completion string to selectively conduct production fluid from said production fluid inlet port to said production fluid flow path, by sliding longitudinally relative to said completion string.

3. The injection and production system recited in claim 1, wherein said injection fluid conduit is slidably mounted in said completion string to selectively conduct injection fluid from said injection fluid flow path to said injection fluid outlet port, by sliding longitudinally relative to said completion string.

4. The injection and production system recited in claim 1, further comprising:

a first packer surrounding said completion string above said production fluid inlet port and said injection fluid outlet port; and a second packer surrounding said completion string below said production fluid inlet port and said injection fluid outlet port.

5. The injection and production system recited in claim 1, further comprising:

a plurality of said production fluid conduits; and a plurality of said injection fluid conduits.

6. The injection and production system recited in claim 5, wherein each of said production fluid conduits is associated with an adjacent said injection fluid conduit to comprise an associated pair of fluid conduits, and further comprising a packer surrounding said completion string between adjacent said associated pairs of said production and injection fluid conduits.

7. The injection and production system recited in claim 1, further comprising a tubular production string within said completion string, wherein:

said production fluid flow path passes through said production string; and said production fluid conduit is adapted to shift relative to said completion string to selectively conduct production fluid from said production fluid inlet port to said production string.

8. The injection and production system recited in claim 1, further comprising a tubular production string within said completion string, wherein:

said injection fluid flow path passes through a space between said production string and said completion string; and said injection fluid conduit is adapted to shift relative to said completion string to selectively conduct injection fluid from said space between said production and completion strings to said injection fluid outlet port.

9. The injection and production system recited in claim 1, further comprising a tubular production string within said completion string, wherein:

said injection fluid flow path includes a space between said production string and said completion string;

said production fluid conduit passes through said space between said production string and said completion string; and said production [fluid] *sleeve* bypass channel bypasses said production fluid conduit from a portion of said space above said production fluid conduit to a portion of said space below said production fluid conduit.

10. The injection and production system recited in claim 1, further comprising a tubular production string within said completion string, wherein:

said injection fluid flow path includes a space between said production string and said completion string;

said injection fluid conduit passes through said space between said production string and said completion string; and said injection fluid bypass channel bypasses said injection fluid conduit from a portion of said space above said injection fluid conduit to a portion of said space below said injection fluid conduit.

11. The injection and production system recited in claim 1, wherein said production fluid conduit is adapted for shifting under remote control to selectively conduct production fluid from said production fluid inlet port to said production fluid flow path.

12. The injection and production system recited in claim 11, further comprising a hydraulic actuator adapted to remotely shift said production fluid conduit.

13. The injection and production system recited in claim 1, wherein said injection fluid conduit is adapted for shifting under remote control to selectively conduct injection fluid from said injection fluid flow path to said injection fluid outlet port.

14. The injection and production system recited in claim 13, further comprising a hydraulic actuator adapted to remotely shift said injection fluid conduit.

15. A system for injecting fluid into, and producing fluid from, multiple zones in a well bore, comprising:

a tubular completion string, said completion string having a production fluid inlet port and an injection fluid outlet port;

a production fluid flow path within said completion string;

an injection fluid flow path within said completion string;

a production sleeve mounted within said completion string;

an injection sleeve mounted within said completion string;

a production sleeve bypass channel connecting a portion of said injection fluid flow path above said production sleeve to a portion of said injection fluid flow path below said production sleeve;

an injection sleeve bypass channel connecting a portion of said injection fluid flow path above said injection sleeve to a portion of said injection fluid flow path below said injection sleeve;

a production fluid conduit in said production sleeve, said production sleeve being adapted to shift relative to said completion string to selectively conduct production fluid from said production fluid inlet port to said production fluid flow path via said production fluid conduit; and an injection fluid conduit in said injection sleeve, said injection sleeve being adapted to shift relative to said completion string to selectively conduct injection fluid from said injection fluid flow path to said injection fluid outlet port via said injection fluid conduit.

16. The injection and production system recited in claim 15, wherein said production sleeve is slidably mounted in said completion string to selectively conduct production fluid from said production fluid inlet port to said production fluid flow path, via said production fluid conduit, by sliding longitudinally relative to said completion string.

17. The injection and production system recited in claim 15, wherein said injection sleeve is slidably mounted in said completion string to selectively conduct injection fluid from said injection fluid flow path to said injection fluid outlet port, via said injection fluid conduit, by sliding longitudinally relative to said completion string.

18. The injection and production system recited in claim 15, further comprising:

a first packer surrounding said completion string above said production and injection sleeves; and a second packer surrounding said completion string below said production and injection sleeves.

19. The injection and production system recited in claim 15, further comprising:

a plurality of said production sleeves; and a plurality of said injection sleeves.

20. The injection and production system recited in claim 19, wherein each of said production sleeves is associated with an adjacent said injection sleeve to comprise an associated pair of sleeves, and further comprising a packer surrounding said completion string between adjacent said associated pairs of said production and injection sleeves.

21. The injection and production system recited in claim 15, further comprising a tubular production string within said completion string, wherein:

said production fluid flow path passes through said production string; and said production sleeve is adapted to shift relative to said completion string to selectively conduct production fluid from said production fluid inlet port to said production string, via said production fluid conduit.

22. The injection and production system recited in claim 15, further comprising a tubular production string within said completion string, wherein:

said injection fluid flow path passes through a space between said production string and said completion string; and said injection sleeve is adapted to shift relative to said completion string to selectively conduct injection fluid from said space between said production and completion strings to said injection fluid outlet port, via said injection fluid conduit.

23. The injection and production system recited in claim 15, further comprising a tubular production string within said completion string, wherein:

said injection fluid flow path includes a space between said production string and said completion string;

said production sleeve bridges said space between said production string and said completion string; and said production sleeve bypass channel passes through said production sleeve from a portion of said space above said production sleeve to a portion of said space below said production sleeve.

24. The injection and production system recited in claim 15, further comprising a tubular production string within said completion string, wherein:

said injection fluid flow path includes a space between said production string and said completion string;

said injection sleeve bridges said space between said production string and said completion string; and said injection sleeve bypass channel passes through said injection sleeve from a portion of said space above said injection sleeve to a portion of said space below said injection sleeve.

25. The injection and production system recited in claim 15, wherein said production sleeve is adapted for shifting under remote control to selectively conduct production fluid from said production fluid inlet port to said production fluid flow path.

26. The injection and production system recited in claim 25, further comprising a hydraulic actuator adapted to remotely shift said production sleeve.

27. The injection and production system recited in claim 15, wherein said injection sleeve is adapted for shifting under remote control to selectively conduct injection fluid from said injection fluid flow path to said injection fluid outlet port.

28. The injection and production system recited in claim 27, further comprising a hydraulic actuator adapted to remotely shift said injection sleeve.

29. A system for injecting into and producing from multiple zones in a well bore, comprising:

a tubular completion string, said completion string having a production fluid inlet port and an injection fluid outlet port;

a tubular production string within said completion string;

a production sleeve mounted on said production string;

an injection sleeve mounted within said completion string;

a plurality of bypass channels through said production sleeve and said injection sleeve, in fluid communication with a space between said production string and said completion string; a production fluid conduit in said production sleeve, said production sleeve being adapted to shift relative to said completion string to selectively conduct production fluid from said production fluid inlet port to said production string, via said production fluid conduit; and an injection fluid conduit in said injection sleeve, said injection sleeve being adapted to shift relative to said completion string to selectively conduct injection fluid from said space between said production string and said completion string, to said injection fluid outlet port, via said injection fluid conduit.

30. A method for producing fluid from a production zone of a well bore and injecting fluid into an injection zone of a well bore, said method comprising:

providing a tubular completion string, said completion string having a production fluid conduit and an injection fluid conduit therein, said completion string having an inlet port and an outlet port through a wall thereof;

aligning said inlet port with a production zone of a well bore;

aligning said outlet port with an injection zone of said well bore;

pumping injection fluid into an injection fluid flow path within said completion string;

selectively shifting said injection fluid conduit and said production fluid conduit relative to said completion string to place said injection fluid flow path in fluid flow communication with said outlet port, and to place said inlet port in fluid flow communication with a production fluid flow path in said completion string; and injecting fluid through said outlet port into said injection zone and producing fluid through said inlet port from said production zone.

31. The method recited in claim 30, further comprising:

providing a plurality of production fluid conduits and a plurality of inlet ports in said completion string;

aligning said plurality of inlet ports with a plurality of production zones of a well bore;

selectively shifting said plurality of production fluid conduits relative to said completion string to place at least one said inlet port in fluid flow communication with a production fluid flow path in said completion string; and injecting fluid through said outlet port into said injection zone and producing fluid through said at least one inlet port from at least one said production zone.

32. The method recited in claim 30, further comprising:

providing a plurality of injection fluid conduits and a plurality of outlet ports in said completion string;

aligning said plurality of outlet ports with a plurality of injection zones of said well bore;

selectively shifting said plurality of injection fluid conduits relative to said completion string to place said injection fluid flow path in fluid flow communication with at least one said outlet port; and injecting fluid through said at least one outlet port into at least one said injection zone and producing fluid through said inlet port from said production zone.

33. The method recited in claim 30, further comprising:

providing a plurality of production fluid conduits, a plurality of injection fluid conduits, a plurality of inlet ports, and a plurality of outlet ports in said completion string;

aligning said plurality of inlet ports with a plurality of production zones of a well bore;

aligning said plurality of outlet ports with a plurality of injection zones of said well bore; selectively shifting said plurality of injection fluid conduits and said plurality of production fluid conduits relative to said completion string to place said injection fluid flow path in fluid flow communication with said plurality of outlet ports, and to place said plurality of inlet ports in fluid flow communication with a production fluid flow path in said completion string; and injecting fluid through said plurality of outlet ports into said plurality of injection zones and producing fluid through said plurality of inlet ports from said plurality of production zones.

34. A method for producing fluid from a production zone of a well bore and injecting fluid into an injection zone of a well bore, said method comprising:

providing a tubular completion string, said completion string having a production sleeve and an injection sleeve therein, said completion string having an inlet port and an outlet port through a wall thereof;

aligning said inlet port with a production zone of a well bore;

aligning said outlet port with an injection zone of said well bore;

pumping injection fluid into an injection fluid flow path within said completion string;

selectively shifting said injection sleeve relative to said completion string to place said injection fluid flow path in fluid flow communication with said outlet port;

selectively shifting said production sleeve relative to said completion string to place said inlet port in fluid flow communication with a production fluid flow path in said completion string; and injecting fluid through said outlet port into said injection zone and producing fluid through said inlet port from said production zone.

35. The method recited in claim 34, further comprising:

providing a plurality of production sleeves and a plurality of inlet ports in said completion string;

aligning said plurality of inlet ports with a plurality of production zones of a well bore;

selectively shifting said plurality of production sleeves relative to said completion string to place at least one said inlet port in fluid flow communication with a production fluid flow path in said completion string; and injecting fluid through said outlet port into said injection zone and producing fluid through said at least one inlet port from at least one said production zone.

36. The method recited in claim 34, further comprising:

providing a plurality of injection sleeves and a plurality of outlet ports in said completion string;

aligning said plurality of outlet ports with a plurality of injection zones of said well bore;

selectively shifting said plurality of injection sleeves relative to said completion string to place said injection fluid flow path in fluid flow communication with at least one said outlet port; and injecting fluid through said at least one outlet port into at least one said injection zone and producing fluid through said inlet port from said production zone.

37. The method recited in claim 34, further comprising:

providing a plurality of production sleeves, a plurality of injection sleeves, a plurality of inlet ports, and a plurality of outlet ports in said completion string;

aligning said plurality of inlet ports with a plurality of production zones of a well bore;

aligning said plurality of outlet ports with a plurality of injection zones of said well bore;

selectively shifting said plurality of injection sleeves relative to said completion string to place said injection fluid flow path in fluid flow communication with said plurality of outlet ports;

selectively shifting said plurality of production sleeves relative to said completion string to place said plurality of inlet ports in fluid flow communication with a production fluid flow path in said completion string; and injecting fluid through said plurality of outlet ports into said plurality of injection zones and producing fluid through said plurality of inlet ports from said plurality of production zones.

*38. A system for injecting fluid into, and producing fluid from, multiple zones in a wellbore, comprising:*

*a tubular completion string;*

*a production fluid flow path within said completion string adapted to be in selective communication with a plurality of production zones;*

*an injection fluid flow path within said completion string adapted to be in selective communication with a plurality of injection zones;*

*a flow control device comprising:*

*a production sleeve member that is moveable between an open position, wherein fluid communication is permitted between a production zone and a production fluid flow path, and a closed position, wherein fluid communication between the production zone and the production fluid flow path is blocked; and*

*an injection sleeve member that is moveable between an open position, wherein fluid communication is permitted between an injection fluid flow path and an injection zone, and a closed position, wherein fluid communication between the injection fluid flow path and the injection zone is blocked.*

*39. The system of claim 38 wherein the production and injection sleeve members are moveable between their open and closed positions by shifting the sleeve members axially with respect to the completion string.*

*40. The system of claim 39 whereby the sleeves are shifted hydraulically.*

*41. The system of claim 38 wherein the production fluid flow path is located coaxially within the injection fluid flow path.*

*42. The system of claim 38 wherein the completion string is constructed of flush joint tubing to provide a substantially uniform outer diameter.*

*43. A method of producing fluid from and injecting fluid into a wellbore, comprising the steps of:*

*disposing a completion string into the wellbore, the completion string having a production fluid flow path and an injection fluid flowpath defined therein;*

*providing selective fluid communication between the production fluid flowpath and the surrounding wellbore to selectively permit production fluid to enter the production fluid flowpath from the wellbore; and*

*providing selective communication between the injection fluid flowpath and the surrounding wellbore to selectively permit injection fluid to pass into the wellbore from the injection fluid flowpath by shifting a shiftable sleeve from an open position to a closed position and from a closed position to an open position to selectively open and close an injection fluid port within the injection fluid flowpath.*

*44. The method of claim 43 wherein selective fluid communication between the production fluid flow path and the wellbore is provided by actuating a flow control device that is moveable between a closed position, wherein flow is blocked, and an open position, wherein flow is permitted.*

*45. The method of claim 43 wherein production fluid is selectively drawn into the production fluid flowpath from a first zone within the wellbore, and injection fluid is selectively injected into a second zone within the wellbore.*

* * * * *